March 2, 1948.    E. M. HUNT    2,436,806
FORMING AND SHEARING DEVICE
Filed Sept. 27, 1945    2 Sheets-Sheet 1

INVENTOR
EVERETT M. HUNT

BY Ralph L Chappell
ATTORNEY

March 2, 1948.  E. M. HUNT  2,436,806
FORMING AND SHEARING DEVICE
Filed Sept. 27, 1945  2 Sheets-Sheet 2

INVENTOR
EVERETT M. HUNT

BY Ralph Chappell
ATTORNEY

Patented Mar. 2, 1948

2,436,806

UNITED STATES PATENT OFFICE 2,436,806

FORMING AND SHEARING DEVICE

Everett M. Hunt, Portsmouth, N. H.

Application September 27, 1945, Serial No. 619,003

1 Claim. (Cl. 153—2)

(Granted under the act of March 3, 1883, as amended April 30, 1928; 370 O. G. 757)

This invention relates to forming and shearing devices and is herein illustrated as embodied in a device for forming and shearing cleats such as are used for securing handles on baking pans.

It is an object of this invention to provide a forming and shearing device in which a reciprocatory element thereof, during its working stroke, performs the dual function of first, forming a workpiece by bending, and then shearing or trimming said workpiece into the desired shape.

Another object of this invention is to provide a device of this character in which the forming element, following the forming operation, serves also to hold the workpiece securely in position for the subsequent shearing or trimming operation.

A further object of this invention is to provide a device of this character which is composed of a few simple and inexpensive parts that are arranged to be easily assembled and which are reliably operative to form and shear workpieces in a smooth and efficient manner.

With the above and other objects and features in view, the invention will now be described with reference to the accompanying drawings which illustrate a preferred embodiment of the invention and will be pointed out in the claim.

Figure 1:
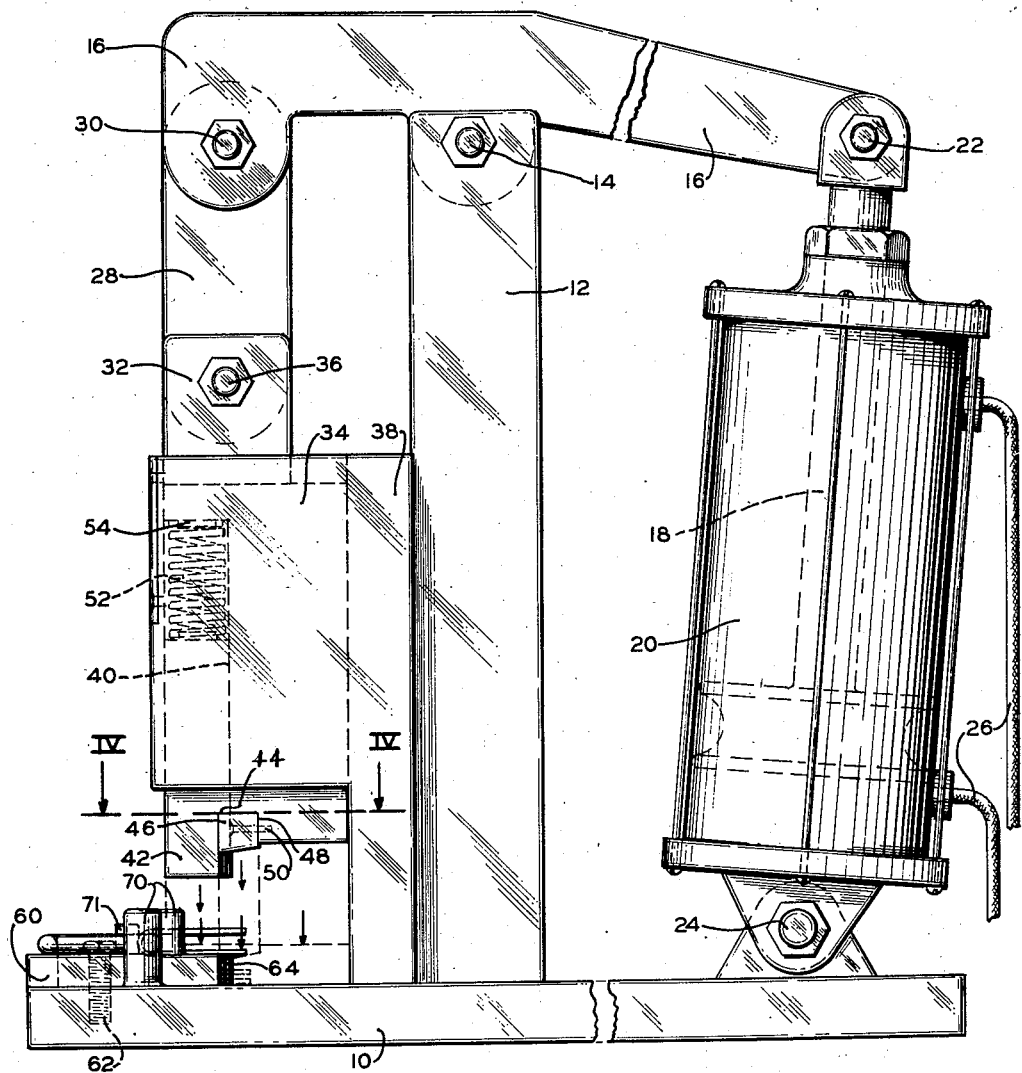
Fig. 1 is a right side elevation of the improved forming and shearing device.

The device comprises a base 10 having an upright member 12 to the upper end of which is pivoted as at 14, a cross bar 16. The bar 16 may be oscillated by any suitable power means. The power means herein shown comprises a pneumatically operated piston 18 contained within a cylinder 20. The upper end of the piston 18 is pivotally connected as at 22 to the right-hand end of the bar 16. The lower end of the cylinder unit is pivotally anchored as at 24 to the base 10. Air inlet and outlet feed lines 26 communicating with the cylinder and with suitable valve means (not shown) operate to drive the piston first, in an upwardly direction, and then, in a downwardly direction. In this manner the bar 16 is oscillated about the pivot 14. The left end of the bar 16 is bifurcated to receive the upper end of a link 28 which is pivotally connected thereto by a stud 30. The lower end of link 28 is received between two upstanding lugs 32 formed on a slide 34, a stud 36 passing through the lugs and the link providing a pivot connection therebetween. The slide 34 is mounted for vertical sliding movement within a housing 38 suitably secured to the base 10 and upright member 12.

By the train of connections just described, it is apparent that as the cross bar 16 is oscillated, the slide 34 is reciprocated downwardly and upwardly. The forward face of the slide 34 is recessed at 40 to receive a forming member 42. The lower rear face of the forming member 42 is undercut to provide a shoulder 44 and is held in assembled position within the recess 40 by a transversely extending shearing die 46. The shearing die 46 is seated within a recess 48 provided in the slide 34 and is secured therein by screws 50 passing through the die and threaded into the slide 34.

A plurality of springs 52 inserted between a shoulder 54 of the recess 40 and the upper end of the forming member 42, yieldingly urge the latter downwardly, so that the shoulder 44 is held in engagement with the upper face of the shearing die 46. A cap 56 removably mounted on the forward face of the housing 38 by screws 58, permits the insertion of the springs 52 into their assembled position as above described.

Figure 2:
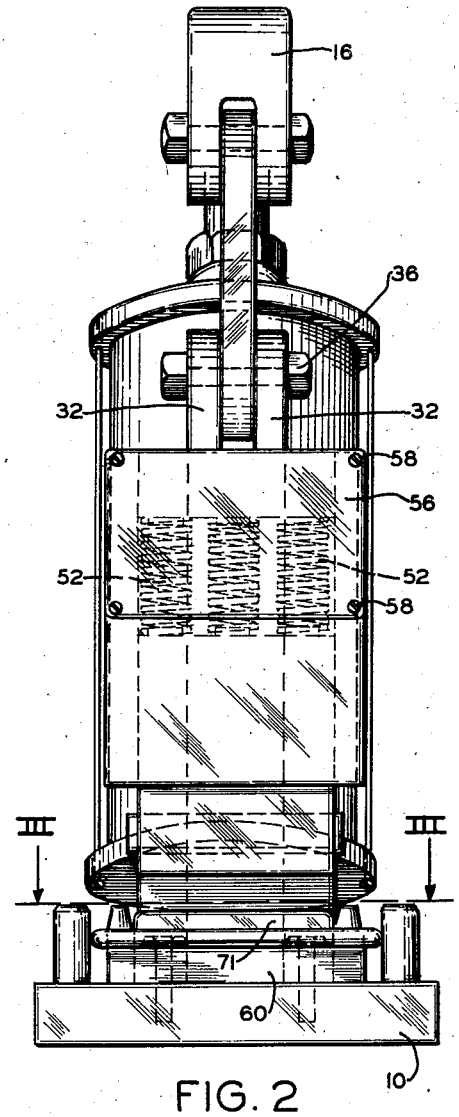
Fig. 2 is a front elevation thereof.
Figure 4:
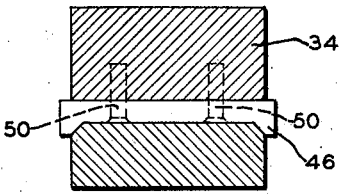
Fig. 4 is a partial sectional plan view taken on the line IV—IV of Fig. 1.

When the parts occupy their normal positions as shown in Figs. 1 and 2 the lower face of the forming member 42 is spaced a slight distance away from the lower face of the shearing die 46 as will be readily observed from these figures.

Figure 3:
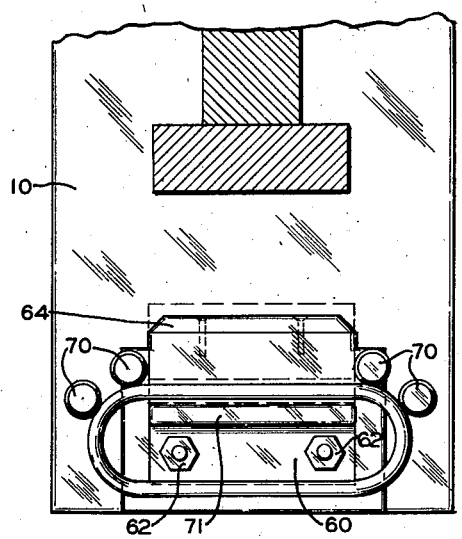
Fig. 3 is a partial sectional plan view taken on the line III—III of Fig. 2.

Directly beneath and in alignment with the forming member 42 and shearing die 46 is an anvil 60 secured by studs 62 (see also Fig. 3). The anvil 60 has secured to its rear face a shearing die 64 of a configuration that is complementary to the shearing die 46. The cutting edge of the upper die 46 lies in cooperative vertical alignment with the cutting edge of the lower die 64.

Figures 6, 7:
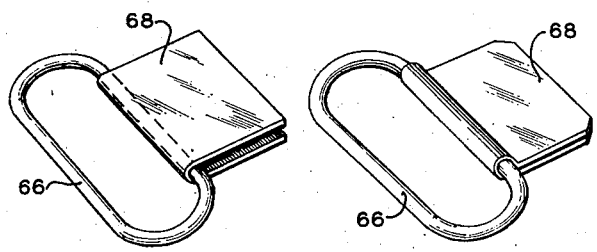
Fig. 6 illustrates a baking pan handle with an attaching cleat mounted thereon, the latter being representative of the type of workpiece upon which the device is adapted to operate.
Fig. 7 is a view similar to Fig. 6 but showing the cleat after it has been bent and sheared by the device.

A workpiece representative of the type for which the device is found especially useful in performing bending and shearing operations, is illustrated in Figure 6. This figure shows a wire handle 66 such as is used on baking pans. These handles are secured to the pan proper by U-shaped clips or cleats 68 that are arranged to be welded or otherwise suitably secured to the body of the pan. It is necessary, however, before the cleat 68 is secured to the pan, that its upper leaf be pressed against the lower leaf thereof, and that excess metal along its outer edge be sheared therefrom. It is toward the performance of these operations that the present invention is directed. In operation, the handle 66 and cleat 68 are placed upon the anvil 60 as shown in Figure 3. Suitable spaced, upstanding, guide pins 70 and a boss 71 are so located as to engage the sides of the cleat and portions of the wire handle to hold these parts in proper registration on the anvil for the bending and shearing operations to be performed.

Figure 5:
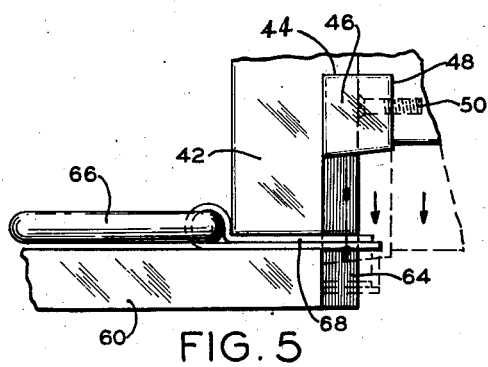
Fig. 5 is a fragmental side elevation of the forming and shearing elements illustrating a portion of the former with respect to the workpiece at the completion of its working stroke movement and just prior to the operation of the shearing element.

With the handle and cleat so mounted, as illustrated in Figure 1, upon operation of the power means 18—20, as the slide 34 moves downwardly on its working stroke, the forming member 42 engages the upper leaf of the cleat 68 and presses it firmly against the lower leaf of the cleat as illustrated in Figure 5. As the slide 34 continues further downwardly on the working stroke the forming member is driven upwardly against the tension exerted by the springs 52 and the cutting edge of the shear die 46 engages the upper leaf of the cleat, and in the next increment of movement of the slide 34, shears the now uneven end portions of the cleat cleanly and smoothly to a flush parallel edge with beveled corners as illustrated in Figure 7. During this shearing action the pressure of the forming member 42 serves to assist in holding the cleat 68 securely in position, thus aiding in obtaining a smooth, even cutting action. Immediately following this shearing operation, after the slide 34, shearing die 46, and forming member 42 have been restored to their upper positions on the return stroke, the workpiece is removed and a new piece inserted ready for the next forming and shearing operation to be performed.

The invention described herein may be manufactured and used by or for the government of the United States of America for government purposes without the payment of any royalty thereon or therefor.

Having described my invention what is claimed as novel and desired to be protected by Letters Patent of the United States is:

Apparatus for attaching a cleat to a handle and for substantially simultaneously shearing said cleat to the desired shape comprising, a frame having a power operated slide mounted for reciprocatory movement thereon, an anvil on said frame in alignment with said slide for supporting said handle and said cleat in cooperative relation therewith, said cleat being formed from a rectangular workpiece and having a U-shape, said handle being positioned within said U-shaped cleat, shearing means on said anvil, a forming member yieldingly mounted within said slide, and a second shearing means mounted on said slide, said anvil coacting with said forming member as it is pressed against the cleat to crimp said cleat about said handle, and then further holding said cleat in correct position for said shearing means to shear coactively said cleat to the desired shape upon further advance of said slide.

EVERETT M. HUNT.

REFERENCES CITED

The following references are of record in the file of this patent:

UNITED STATES PATENTS

| Number | Name | Date |
|--------|------|------|
| 939,468 | Boyce | Nov. 9, 1909 |